Sept. 29, 1970        J. H. JOHNSON        3,531,147
CONCEALED WELD CONSTRUCTION
Original Filed Feb. 14, 1967        2 Sheets-Sheet 2
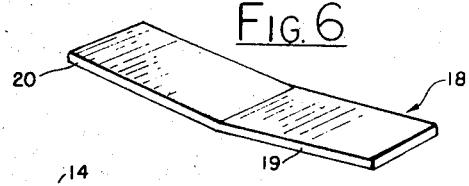
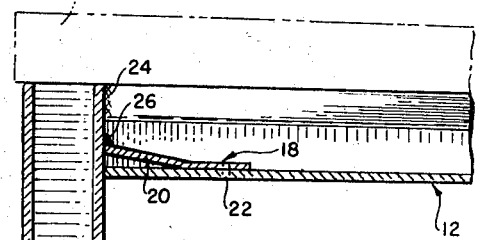
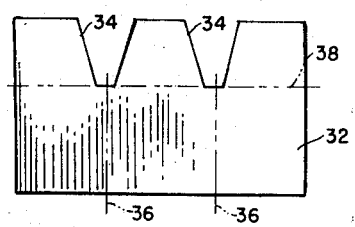
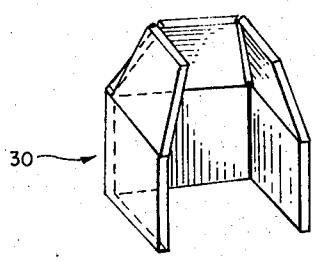
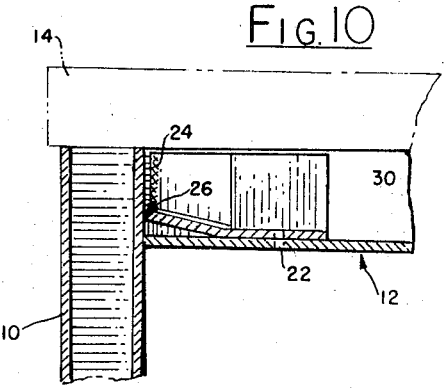
INVENTOR.
JOHN H. JOHNSON
BY
*Bean, Brooks, Buckley & Bean*
ATTORNEYS

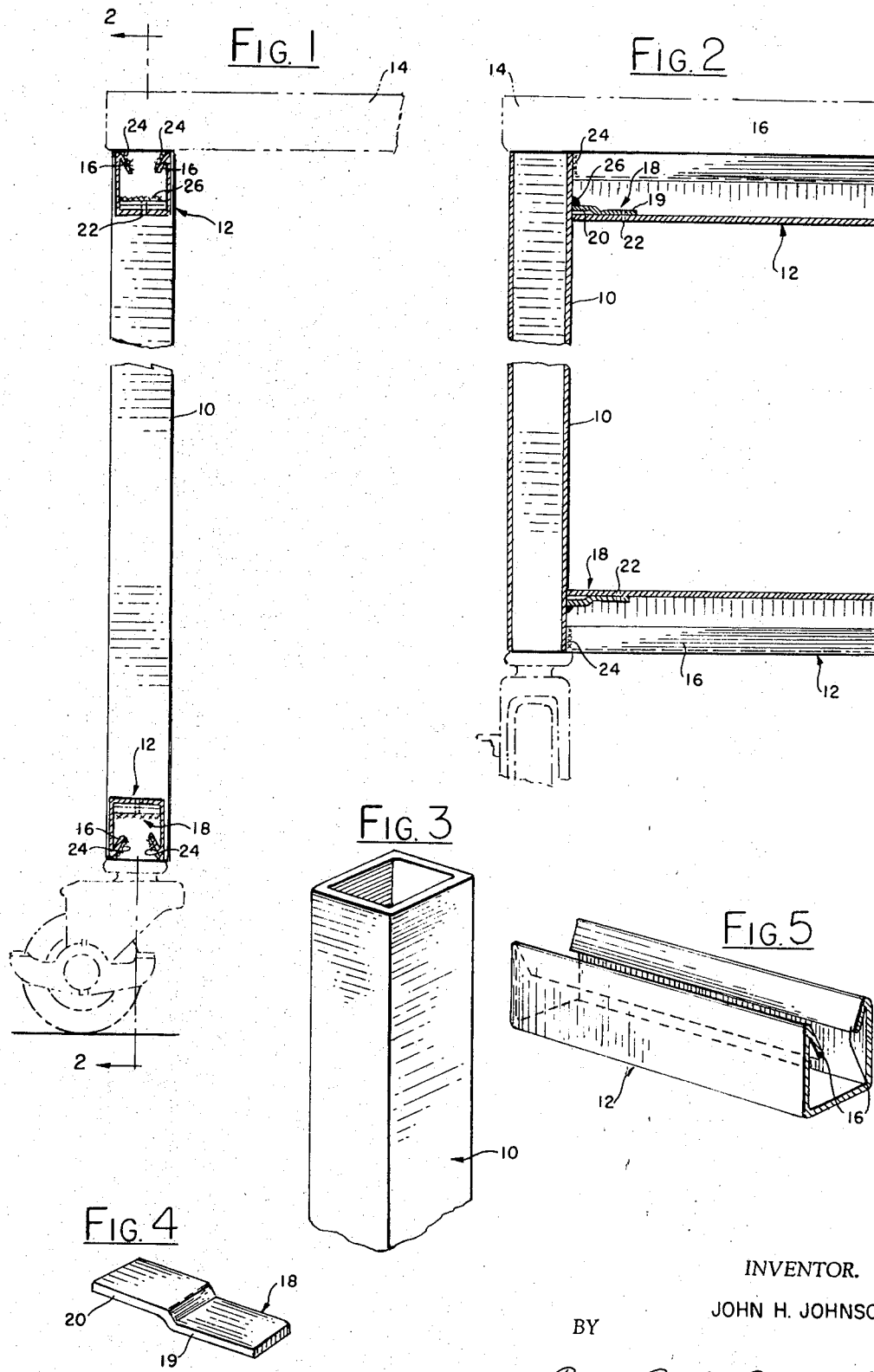

United States Patent Office 3,531,147
Patented Sept. 29, 1970

3,531,147
CONCEALED WELD CONSTRUCTION
John H. Johnson, Jamestown, N.Y., assignor to
Art Metal, Inc., Jamestown, N.Y.
Original application Feb. 14, 1967, Ser. No. 616,761.
Divided and this application Apr. 14, 1969, Ser. No. 836,184
Int. Cl. F16b 7/00, 12/50
U.S. Cl. 287—189.36                    7 Claims

ABSTRACT OF THE DISCLOSURE

A welding means and method for use in constructing metal furniture joints or the like, providing a joint of superior mechanical strength while all evidences of welding heat disfigurement are confined within areas not normally viewable when the product is in use.

This application is a division of application Ser. No. 616,761, filed Feb. 14, 1967.

BRIEF SUMMARY OF THE INVENTION

This invention relates to furniture or the like, of the metal frame type; and more particularly to an improved welded frame structure and the manufacturing method thereof.

In the manufacturing of furniture of the welded metal frame type typical production methods have been found to involve certain difficulties and disadvantages due to discoloration and/or other disfigurations of the metal parts during the welding processes. Hence the parts require subsequent refinishing, resulting in excessive fabrication costs and/or inferior quality products.

For example, in order to provide the framing members in the finished product with highly polished metal appearance in accord with prior manufacturing methods the structures are usually fabricated initially of unfinished metal work by conventional welding processes; and then the frame (while in assembled form) is subjected to cleaning, anodizing, plating, and/or polishing operations. Thus, the finishing operations are performed under extremely adverse and disadvantageous conditions in that the welded-together and relatively bulky frame structures must be carried from place to place; dipped and drained; tumbled and turned through a variety of positions at a variety of processing stations; and/or otherwise handled for the sole purpose of remedying the ornamental disfigurations incurred during the parts welding processes. Thus, to "finish" the product to a satisfactorily cleaned and polished condition, such operations are obviously awkward, time-consuming, and expensive.

It is a primary object of the present invention to provide an improved manufacturing system whereby to produce by simple and easily performed shop processes a product of improved appearance at substantially reduced cost. Other, more detailed, objects and advantages of the invention will appear from the specification hereinafter.

In the drawing:

FIG. 1 is a fragmentary side elevational view partly in vertical section, of a metal frame structure comprising a "leg" and top and bottom "runner" components fabricated in accordance with the invention;

FIG. 2 is a fragmentary sectional view taken as suggested by line 2—2 of FIG. 1;

FIG. 3 is a top end perspective view on enlarged scale, of the leg member of the structure of FIG. 1;

FIG. 4 is a disassembled perspective view of a connection member of the frame joint assembly of FIGS. 1–2;

FIG. 5 is a fregmentary perspective view of the upper rail member of the structure of FIGS. 1–2;

FIG. 6 is a disassembled perspective view of a modified form of the connection clip member shown in FIG. 4;

FIG. 7 corresponds to the upper portion of FIG. 2, but illustrates the use of the form of connection device shown in FIG. 6;

FIG. 8 illustrates in plan view a formed blank from which a still further modified form of connection clip device may be fabricated;

FIG. 9 is a view in perspective of the modified form of connection device fabricated from the blank of FIG 8; and FIG. 10 is a view corresponding to FIGS. 2 and 6, but illustrating the use of a connection clip device of the type shown in FIG. 9.

The present invention is applicable to the fabrication of any welded joint constructions between angularly abutting ornamental metal strut member or the like; and by way of example is shown herein in conjunction with the manufacture of a metal table or chair frame or the like comprising legs 10 and "runners" or "spreaders" 12—12; the upper runner being adapted to support a table top or the like as indicated at 14. Thus, the frame shown by way of example is of the type which may readily be fabricated of standard rectangular or square-sectioned metal tubing, welded together at the illustrated joint positions. Obviously, the same type construction may be used to fabricate chair frames, sofa frames, and a large variety of other furniture items.

The present invention contemplates, in lieu of the prior processing systems hereinabove described, a novel welded joint fabricating technique which avoids the production of any normally visible metal tarnishing or other disfiguration effects incidental to the fabrication of the requisite welded joints. Hence, the system of the present invention permits the use of metal stock pieces which have been pre-cleaned and plated and/or polished under ideal conditions and therefore at minimum expense; and which eliminates the heretofore requisite post-assembly welding cleaning and plating and/or polishing operations which have been heretofore so troublesome and expensive, as explained hereinabove.

For example, as shown in FIG. 1 herewith, a table may be constructed to comprise vertical legs 10 interconnected by spreaders 12 (either only at the top of the structure or both at the top and bottom thereof as shown) and supporting a table top plate 14. Thus, when the table is completed the table top element rests upon and covers the tops of the spreaders 12 which are butt-welded at their ends to the legs 10. Therefore, in accordance with the present invention, the spreaders 12 are of novel design, as perhaps best shown in FIG. 5, to be essentially of open top channel-like form but to include inwardly disposed leg portions 16—16 fabricated by bending extensions of the side walls of the channels inwardly and downwardly into inclined attitudes within the otherwise open interiors of the spreaders. Note that as shown in FIGS. 1, 5, the legs 16 are spaced inwardly from the outside walls of the channel. A connection or "clip" member 18 (FIG. 4) formed by offset-bending a metal plate to provide a base portion 19 and an offset cap portion 20 is spot-welded to the bottom inner end portion of the rail 12 as indicated at 22 (FIG. 2) prior to plating and/or polishing or otherwise "finishing" the runner member 12.

To assemble the furniture frame structure the leg and runner are brought into relative alignment as shown in FIG. 2, and then the runner is butt-welded to the leg from above as indicated in FIGS. 1, 2, at 24, 24, 26. The welding process is easily performed from above and entirely within the open confines of the runner member. Thus it will be appreciated that all of the weld material is disposed within the interior of the channel member, and out of view. Therefore, it needs no subsequent "dressing down" as in the case of exposed welds. Also, the heat-tarnish effects of the weld are confined to the flanges 16, 16, of the runner and to the cap portion 20 of the clip 18, and to the rear surface of the leg member which is covered by the side walls of the runner member. Hence, heat-tarnish effects of the welding operation are out of view from any angle when the furniture is in use. Also, note that the weld zones between the flanges 16, 16, of the runner 12 and the rear face of the leg member 10 are angularly related, thereby providing a diagonal bracing effect for the structural connection.

Also, as shown in FIGS. 1, 2, bottom "runner" members 12 may be disposed in down-facing attitudes. Thus, in any case the non-ornamental open face portions of the spreaders will be turned away from view when the furniture is in use, and the ends of the spreaders will be butt-welded to the legs 10 of the furniture piece as explained hereinabove. The top plate 14 may of course be fastened to the leg and runner sub-assembly by any suitable means, not shown.

Thus it will be apparent that by virtue of use of the joint fabricating method hereof a joint of superior mechanical strength is provided while at the same time all evidences of welding heat disfigurement are confined within zones which are not in view when the product is put into use. This means that the assembly may be fabricated of stock pieces which have all been pre-finished under ideal conditions; that is, cleaned and plated or polished, as the case may be. For example, the stock pieces may be purchased in standard lengths and in perfectly pre-finished form, and then cut into proper lengths and assembled by the welding method described hereinabove. The product then needs no further finishing operations, and the savings in overall manufacturing cost are of course substantial. However, it will be appreciated that the frame parts may be cut from unfinished stock and interconnected by the method hereof, and subsequently painted or otherwise finished, if preferred.

As shown in FIGS. 6, 7, herewith, the connection clip member utilized in connection with the welding procedure may be of a form shown in FIG. 6 in lieu of the form shown in FIG. 4, it being understood that the cap or end portion 20 thereof in either case is disposed in spaced relation from the wall portion of the member 12 which is to be protected from heat tarnish effects when the weldment 26 is effected.

FIGS. 8, 9, 10, illustrate still another form of connection "clip" device for use in accord with the welding technique of the invention. In this case the clip member is designated generally at 30, and is of such construction as to be readily formed from a blank 32 as illustrated in FIG. 8. The blank is notched as indicated at 34—34 and then bent along the fold lines designated 36–36–38 to provide the clip structure shown in FIGS. 9 and 10. The clip device will then readily slip-fit into the interior of standard channel-shaped spreader 12, and may be spot-welded therein as indicated at 22 and then subsequently welded as indicated at 24, 26 to the leg structure 10, while avoiding heat tarnish effects thereon as explained hereinabove in connection with the clip devices illustrated in FIGS. 4 and 6.

Although the method of the invention has been described in detail only in connection with the fabrication of a table or chair leg and spreader joint construction or the like, it is applicable with equal facility to the fabrication of other similar type joints in connection with the manufacture of all types of welded metal furniture or the like; and thus it will be understood that although only a few forms of the invention have been illustrated and described in detail hereinabove, various applications may be made thereof without departing from the spirit of the invention or the scope of the following claims.

I claim:

1. A finished metal furniture frame structure including first and second pre-finished metal frame parts disposed and interconnected in butt-welded relation obscuring from view the weld material and welding-heat disfigurations of said pre-finished metal parts, said structure comprising, a first part of open sided channel-shaped form having the side wall marginal edges thereof bent reversely inwardly to form flanges extending into the open confines thereof, and disposed in end-butted relation with the side wall portion of a second metal part, and a clip member comprising a base portion fixed to the inner surface of the web portion of said channel-shaped part and an offset cap portion spaced from said web portion and terminating in end portion disposed in abutting relation with said second metal part, the ends of said side wall flanges and the end of said clip member cap portion being butt-welded from inside said channel-shaped part to the abutting surface portions of said second part thereby avoiding the formation of any externally viewable weldments and/or weld-heat tarnishing effects.

2. A finished metal furniture frame structure including first and second pre-finished metal frame parts disposed in angularly abutting and welded interconnected relation, said structure comprising, a first part of open sided channel-shaped form having at its abutting end flange-like extensions of the side walls thereof bent inwardly into the open confines thereof and disposed in end-butted relation with one side of said flat-sided second metal part, the ends of said side wall flange-like extensions being butt-welded to the abutting surface portions of said second metal part from inside said channel-shaped part, thereby avoiding the formation of any externally viewable weldments and/or weld-heat tarnishing effects and obscuring from view the weld material and welding-heat disfigurations of said pre-finished metal parts.

3. A finished metal furniture frame structure including first and second pre-finished metal frame parts disposed and interconnected in butt-welded relation obscuring from view the weld material and welding-heat disfigurations of said pre-finished metal parts, said structure comprising, a first frame part of open sided form having spaced apart walls defining an opening therebetween and longitudinally extending leg portions extending angularly inwardly from said walls into the interior of said first frame part, said walls and said leg portions having end edges disposed in a common plane, a second frame part of open rectangular form, said end edges of said walls and said leg portions of the first frame part being disposed against one side of said second frame part, and weld material joining the end edges of said leg portions of the first frame part to said one side of said second frame part.

4. The metal frame furniture structure as defined in claim 3 including a clip member secured within said first frame part and having an end portion lying in said common plane, and weld material joining said end portion of said clip member to said one side of the second frame part.

5. A finished metal furniture frame structure including an upstanding elongate frame part having a flat side, a horizontal elongate frame part of channel form presenting a web and depending side walls, and leg portions extending longitudinally along the lower edges of said side walls and projecting angularly upwardly therefrom into the interior of said horizontal frame part, the ends of said web, said side walls and said leg portions being disposed in abutting relation to said flat side of the upstanding frame part, and weld material joining said ends of the leg portions to said flat side whereby said weld material and any weld-heat tarnishing effects are confined to portions of said frame parts normally hidden from view.

6. The metal furniture frame structure according to claim 5 including a clip member within said horizontal frame part, said clip member having one end portion secured in face-to-face contact with said web and having an opposite end downwardly offset therefrom and presenting an end edge abutting said flat side of the upstanding frame part above said leg portions, and weld material joining said end edge of the clip member to said flat side of the upstanding frame part.

7. A finished metal furniture frame structure including an upstanding elongate frame part having a flat side,
- a horizontal elongate frame part of channel form having a web and depending side walls, the ends of which abut said flat side of the upstanding frame part,
- a clip member disposed within said horizontal frame part, said clip member having one end secured in face-to-face contact with an interior surface of said horizontal frame part and having an opposite end presenting end edges abutting said flat side in inwardly spaced relation to said side wall and said web, and
- weld material joining said end edges of the clip member to said flat side of the upstanding frame part whereby said weld material and any weld-heat tarnishing effects are confined to portions of said frame parts normally hidden from view.

References Cited

UNITED STATES PATENTS

| | | |
|---|---|---|
| 1,290,093 | 1/1919 | Cole. |
| 1,630,492 | 5/1927 | Kusterle. |
| 2,146,333 | 2/1939 | Deming. |
| 2,910,314 | 10/1959 | Klein. |
| 3,236,341 | 2/1966 | Chopinet et al. |

REINALDO P. MACHADO, Primary Examiner

W. L. SHEDD, Assistant Examiner

U.S. Cl. X.R.

108—155